No. 614,546. Patented Nov. 22, 1898.
W. C. GRIESBACH.
BRAKE FOR VEHICLES.
(Application filed Oct. 11, 1897.)
(No Model.)
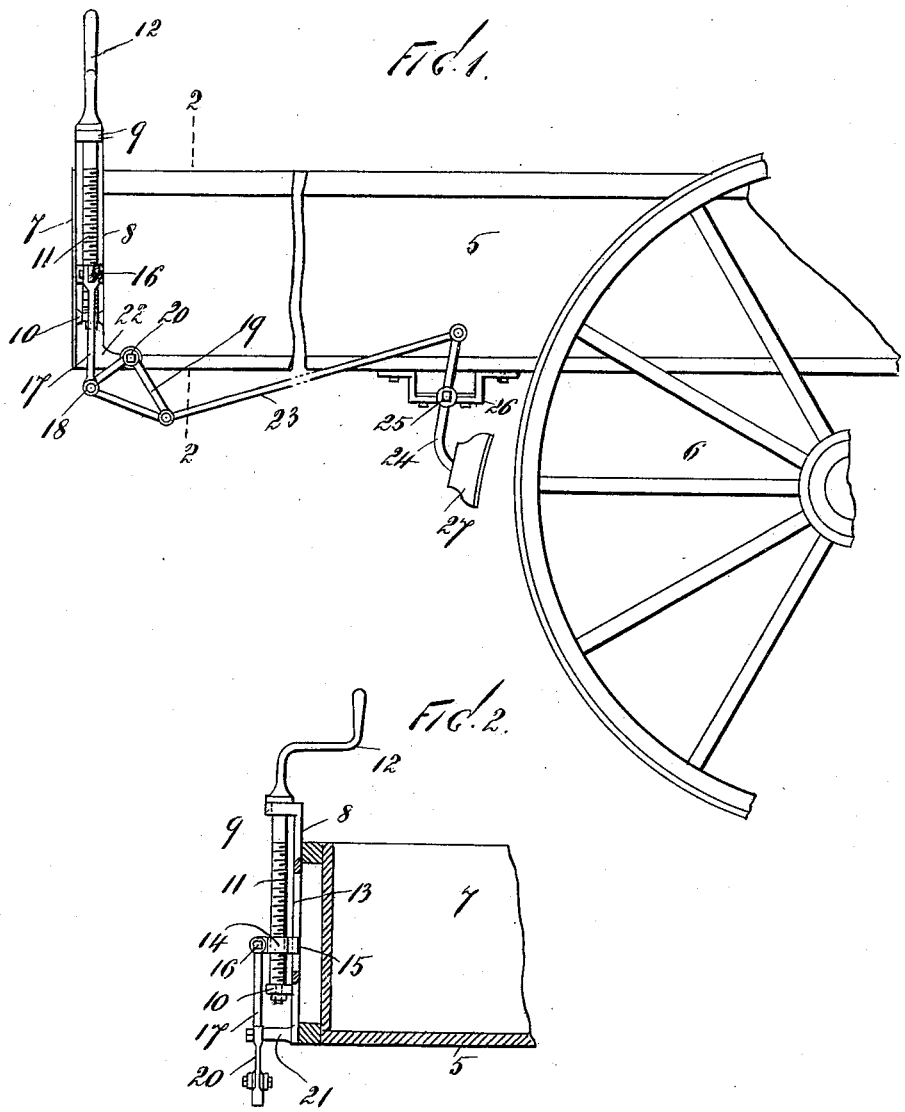
WITNESSES:
John Buckler
C. Gerst
INVENTOR
William C. Griesbach.
BY
Edgar Tate & Co
ATTORNEYS.

UNITED STATES PATENT OFFICE.

WILLIAM CARL GRIESBACH, OF TAURUS, NEW JERSEY.

BRAKE FOR VEHICLES.

SPECIFICATION forming part of Letters Patent No. 614,546, dated November 22, 1898.

Application filed October 11, 1897. Serial No. 654,797. (No model.)

*To all whom it may concern:*

Be it known that I, WILLIAM CARL GRIESBACH, a citizen of the United States, residing at Taurus, in the county of Hudson and State of New Jersey, have invented certain new and useful Improvements in Brakes for Vehicles, of which the following is a full and complete specification, such as will enable those skilled in the art to which it appertains to make and use the same.

This invention relates to brakes for vehicles; and the object thereof is to provide an improved device of this class which is simple in construction and operation and which may be applied to any form of wagon or similar vehicle as now constructed.

The invention is fully disclosed in the following specification, of which the accompanying drawings form a part, in which—

Figure 1 is a side view of a part of the wagon-body and showing a part of one of the wheels and my improved brake connected therewith, and Fig. 2 a partial section on the line 2 2 of Fig. 1.

In the drawings forming part of this specification the separate parts of my improvement are designated by the same numerals of reference in each of the views, and in said drawings I have shown at 5 an ordinary wagon-body and at 6 a part of one of the wheels, and the end-board of the wagon-body is shown at 7, and in the practice of my invention I connect with the end of the wagon-body in any desired manner a plate 8, which is provided at its upper end with an outwardly-directed bearing 9 and near the lower end thereof with another bearing 10, and mounted in said bearings is a vertical, revoluble, and screw-threaded shaft 11, the upper end of which is provided with a crank 12.

The plate 8 is secured to the wagon-body in any desired manner, and said plate is provided centrally thereof with a vertical slot 13, and mounted on the screw-threaded portion of the shaft 11 is a screw-threaded collar 14, which is provided at one side with an arm 15, which projects through the slot 13 in the plate 8, and pivotally connected with or hinged to said collar, at the outer side thereof, as shown at 16, is a rod 17, the lower end of which is pivotally connected at 18 with a crank-lever 19, which is pivotally connected at 20 with a rod or arm 21, formed on or connected with a backwardly-directed extension 22, which is formed on the lower end of the plate 8, or the rod or arm 21 may be connected with the side of the wagon-body, at the bottom thereof, in any desired manner. I also provide a brake-operating rod 23, which is also connected with the crank-lever 19 and with a brake-lever 24, which is pivotally connected at 25 with a hanger 26, which is secured to the bottom of the wagon-body, and the lower end of said brake-lever is provided with a brake-shoe 27, which is adapted to bear on the tire or rim of the wheel 6.

The operation will be readily understood from the foregoing description when taken in connection with the accompanying drawings and the following statement thereof:

By turning the crank 12 of the shaft 11 the collar 14 may be raised or lowered, as will be readily understood, the direction of the movement of said collar depending on the direction in which the crank 12 is turned, and when said collar is forced upwardly the brake-shoe 27 will be applied and when said collar is moved downwardly said brake-shoe will be released from the wheel.

My improved brake is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

In a vehicle-brake, the combination, with a bracket consisting of a plate or web provided with arms projecting forwardly therefrom and having bearings in said arms, the web being provided with a longitudinally-arranged slot intermediately between said arms, of a revoluble screw-shaft operating in the bearings in the arms of the plate, a threaded collar mounted upon said shaft and having the inwardly-projecting extension which is received by and guided in the slot and an outwardly-projecting arm or extension, and connecting-rods extending directly from said outwardly-projecting arm or extension to the brake mechanism, substantially as and for the purpose set forth.

In testimony that I claim the foregoing as my invention I have signed my name, in presence of the subscribing witnesses, this 7th day of October, 1897.

WILLIAM CARL GRIESBACH.

Witnesses:
C. GERST,
A. C. VAN BLARCOM.